United States Patent
Smith (10) Patent No.: US 8,333,146 B2
(45) Date of Patent: Dec. 18, 2012

(54) TWINE END WRAP ADJUSTMENT FOR AGRICULTURAL BALER

(75) Inventor: Kevin M. Smith, Narvon, PA (US)

(73) Assignee: CNH America LLC, New Holland, PA (US)

( * ) Notice: Subject to any disclaimer, the term of this patent is extended or adjusted under 35 U.S.C. 154(b) by 318 days.

(21) Appl. No.: 12/749,236

(22) Filed: Mar. 29, 2010

(65) Prior Publication Data

US 2011/0232509 A1   Sep. 29, 2011

(51) Int. Cl.
B65B 13/18   (2006.01)
(52) U.S. Cl. .................. 100/5; 100/13; 56/341
(58) Field of Classification Search .................. 100/5, 8, 100/13, 88; 56/341; 53/211, 587, 389.3
See application file for complete search history.

(56) References Cited

U.S. PATENT DOCUMENTS

| | | | |
|---|---|---|---|
| 4,167,844 A * | 9/1979 | Freimuth et al. | 56/343 |
| 4,457,226 A * | 7/1984 | Meiers | 100/5 |
| 4,793,249 A | 12/1988 | Wellman | |
| 4,800,811 A | 1/1989 | Wellman | |
| 5,388,504 A | 2/1995 | Kluver | |
| 5,855,167 A | 1/1999 | Goossen et al. | |
| 6,016,646 A | 1/2000 | Taylor et al. | |
| 7,337,713 B1 | 3/2008 | Olander et al. | |
| 7,490,544 B1 | 2/2009 | Bollinger et al. | |
| 7,658,145 B1 | 2/2010 | McClure et al. | |

* cited by examiner

Primary Examiner — Jimmy T Nguyen
(74) Attorney, Agent, or Firm — Patrick M. Sheldrake (57) ABSTRACT

An end wrap adjustment that may be used with an agricultural baler twine wrapping system. More particularly, an end wrap adjustment for improved adjustment of the end wrap location, without the use of tools. The end wrap adjustment provides for the adjustment of the location of the twine at the ends of the bale depending on one or more factors, such as the crop type, storage conditions, operator preference, etc. On one side, the twine dispensing assembly may include a first end wrap adjustment for controlling the position of the twine arm, and hence the twine with respect to an end or side of the bale when the bale wrapping system is in an extended position. On an opposite side, the twine cutting assembly may include a second end wrap adjustment for controlling the position of the twine with respect to an opposite end or side of the bale when the bale wrapping system is in a home position.

16 Claims, 8 Drawing Sheets

TWINE END WRAP ADJUSTMENT FOR AGRICULTURAL BALER

TECHNOLOGY FIELD

The present invention relates generally to a twine wrapping system for wrapping a bale of crop materials formed by an agricultural baler. More particularly, the present invention is directed to a twine end wrap adjustment for an agricultural baler twine wrapping system. The present invention is particularly well suited, but in no way limited, for use with round balers.

BACKGROUND

For many years agricultural balers have been used to consolidate and package crop material so as to facilitate the storage and handling of the crop material for later use. Usually, a mower-conditioner cuts and conditions the crop material for windrow drying in the sun. When the cut crop material is properly dried, a baler, for example a round baler, travels along the windrows to pick up the crop material and form it into cylindrically-shaped round bales.

More specifically, pickups of the baler gather the cut and windrowed crop material from the ground then convey the cut crop material into a bale-forming chamber within the baler. A drive mechanism operates to activate the pickups, augers, and a rotor of the feed mechanism. A conventional bale forming chamber may include of a pair of opposing sidewalls with a series of belts, chains, and/or rolls that rotate and compress the crop material into a cylindrical shaped bale.

When the bale has achieved a desired size and density, a wrapping system may wrap the bale to ensure that the bale maintains its shape and density. For example, a twine wrapping apparatus may be provided to wrap the bale of crop material while still inside the bale forming chamber. A cutting or severing mechanism may be used to cut the twine once the bale has been wrapped. The wrapped bale may be ejected from the baler and onto the ground by, for example, raising a tailgate of the baler. The tailgate is then closed and the cycle repeated as necessary and desired to manage the field of cut crop material.

It is desired to be able to adjust the location of the twine wrapping at the ends of the bale. The desired location of the twine varies depending on, for example, crop type, storage conditions, operator preference, and the like. Some conventional wrapping systems allow for the control of the end wrap location using guides or deflector plates bolted to the side walls of the baler. However, these traditional methods are difficult to implement. For example, conventional means typically require tools to change out the bolted guides or deflector plates. It is desired to be able to adjust the end wrap location easily and without the use of tools.

A bale twine wrapping solution is needed to facilitate easy adjustment of the end wrap location of the twine at the ends of the bale. Preferably, bale twine wrapping solution may be implemented without the use of tools.

SUMMARY

Embodiments of the present invention address and overcome one or more of the above shortcomings and drawbacks, by providing a twine wrapping system and method that allows accurate position of the twine on the ends of the bale and that is easy to implement. Preferably, the end wrap adjustment does not require tools to make the adjustment of the twine on the bale. Embodiments of the present invention may include to a twine end wrap adjustment for use on round balers.

In some embodiments, with the twine dispensing assembly may include an adjustable stop for positioning the twine arms at, for example, a right-hand side of the baler (extended position). For example, the twine dispensing assembly may include a stop pin and an adjustable stop plate for adjusting a twine arm stopping position, and hence the end wrap position of the twine on the bale. The stop pin contacts the stop plate, which prevents the twine arms from moving further to the right, for example. Alternatively, the position of the stop pin may be adjustable. By adjusting the stop plate and/or selecting different locations for the stop pin, the twine arms can be allowed to rotate further from or closer to the edge or side (e.g., right side) of the bale. For the opposite side of the baler, e.g., a left-hand side, (home position) a twine guide on a knife support assembly may serve to adjustably position the twine as the twine arms move to the home position. By repositioning the twine knife support assembly, the twine may be located closer to or further from the edge or side (e.g., left side) of the bale. In some embodiments, the twine knife support assembly may be repositioned by first releasing a clip pin holding a positioning comb. The comb then can pivot away from the linkage (e.g., a connecting rod) to allow the knife support assembly to slide in/out (laterally side to side) on a knife pivot bar. After repositioning, the comb may be returned to the original position to retain the linkage and the pin is reinserted holding the comb in place.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF ILLUSTRATIVE EMBODIMENTS

The above problems in the prior art have motivated the creation of a twine wrapping system 11 having an end wrap adjustment to more accurately and easily position twine on a bale of crop material. Embodiments of the present invention provide a right hand or extended position end wrap adjustment and/or a left hand or home position end wrap adjustment of the twine on the bale. Embodiments of the present invention provide a right hand or extended position end wrap adjustment as part of the twine dispensing assembly 12. Embodiments of the present invention provide a left hand or home position end wrap adjustment as part of the twine cutting assembly 13. Embodiments of the present invention provide a right hand or extended position end wrap adjustment to control the lateral end position of the twine arms thereby allowing adjustment in and out of the twine on the right side of the bale. Embodiments of the present invention provide a left hand or home position end wrap adjustment of the twine via controlled adjustment of the twine knife support assembly laterally side to side allowing end position adjustment of the twine on the left side of the bale.

Embodiments of the present invention are particularly well suited, but in no way limited to, use with agricultural balers. The present invention may also find utility in use with round, square, or rectangular balers, for example.

Agricultural balers, such as round balers, are well known in the agricultural industry, and the instant invention can be used with substantially any of such machines. Reference is made, for example, to U.S. Pat. Nos. 6,877,304; 6,688,092; 6,644,006 and 6,295,797 that illustrate such balers, the disclosure of which is incorporated herein by reference in their entirety. For illustrative purposes, details of an exemplary round baler in which the up-cut net knife of the present invention may be used are disclosed in and will be described, in part, with reference to U.S. Pat. No. 5,581,976, which is also hereby incorporated by reference in its entirety.

Figure 1:
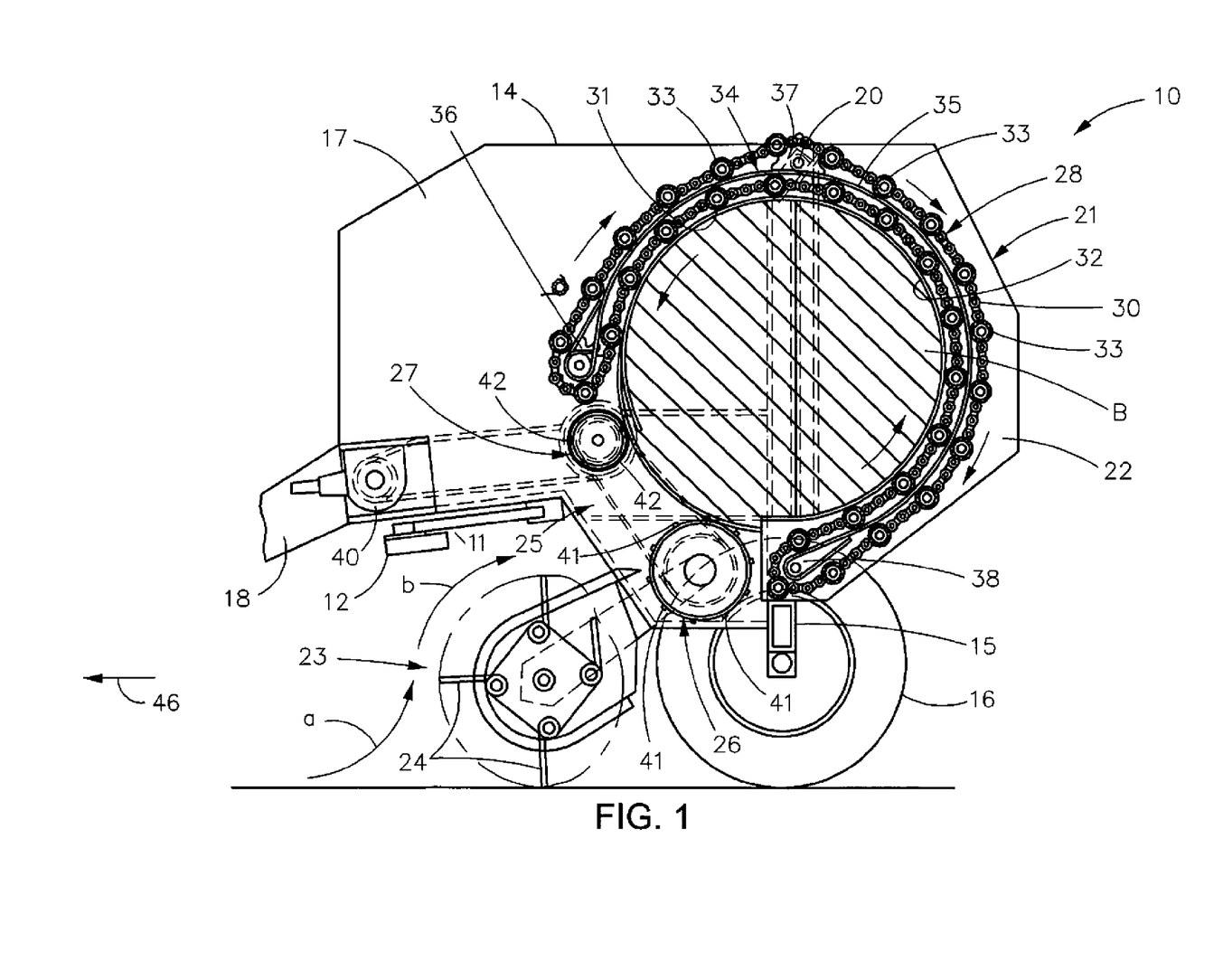
FIG. 1 is a cutaway side elevational view of an exemplary round baler in which embodiments of the twine wrapping system end wrap adjustment of the present invention may be employed.

FIG. 1 depicts an exemplary agricultural round baler, generally designated 10, in which embodiments of the end wrap adjustment of the present invention may be employed. As alluded to previously, the crop in the field is usually arranged in a windrow as it is engaged by the baler 10 being pulled along a windrow of cut crop material by a tractor (not shown). A forward direction of travel of the baler 10 is depicted by arrow 46.

FIG. 1 shows a fixed chamber round baler 10 having a wrapping system 11 for wrapping a cylindrical package of crop material (not shown) formed in a round baler 10. More particularly, the twine wrapping system 11 of baler 10 comprises a twine dispensing assembly 12 and a twine cutting assembly 13 for cutting web material, such as twine.

As shown, round baler 10 includes a main frame 14 with a main support beam 15 on which a pair of wheels 16 (only one shown) are rotatably affixed. The main frame includes a pair of side walls between which a cylindrical bale forming chamber extends. For the purposes of clarity only one wall 17 is shown in FIG. 1 and the elements mounted inwardly thereof are shown in full lines for clarity, which is an approach not uncommon in the descriptions in patents. For illustrative purposes reference letter B is used to designate a bale, shown in cross section in the chamber.

Baler 10 also includes a tongue 18 extending from the forward portion of main frame 14 for conventional connection to a tractor (not shown). Pivotally connected to the sidewalls of main frame 14 by a pair of stub shafts 20 is tailgate 21 which may be closed, as shown throughout the drawings, during bale formation or pivoted open about stub shafts 20 to discharge a completed bale. The tailgate includes tailgate walls 22 coextensive with side walls 17. A pickup assembly 23 mounted on main frame 14 in a suitable manner includes a plurality of fingers or tines 24 moveable in a predetermined path to lift crop material from the ground, generally depicted by direction arrow a, and deliver it rearwardly (arrow b) toward a transverse inlet 25 in the chamber defined by a floor roll 26 and a transverse stripper roll 27, both of which rolls are rotatably supported on mainframe 14 between sidewalls 17.

As shown, the bale forming chamber is defined primarily by an apron assembly 28 comprising a pair of support chains 30 mounted to travel along a continuous path, the inner run of which is defined on sidewalls 17 and tailgate walls 22 by front and rear sections 31, 32 of a continuous chain guide track that separates at a point of track adjacent the stub shaft 20 during bale discharge. The apron further comprises a plurality of parallel tubular crop engaging slats 33 extending between chains 30 to provide a cage-like periphery of the cylindrically shaped chamber. Radially outward of the inner run of apron assembly 28 are front and rear sections 34, 35 of continuous cylindrical bale chamber wall. These sections, also separable during bale discharge are mounted between side walls 17 and tailgate walls 22, respectively, for maintaining integrity between the outer and inner runs of chain 30. Operatively engaged with chain 30 are drive sprocket 36 mounted between sidewalls 17, idler sprockets 37 also mounted between sidewalls 17 on shaft 20, and idler sprocket 38 mounted between tailgate walls 22. A conventional chain drive system for drive sprocket 36 is provided via appropriate coupling to gearbox 40 in a conventional manner, diagrammatically depicted in phantom outline outwardly of sidewall 17. The bale forming chamber is further defined by the outer conveying surfaces of floor roll 26 and stripper roll 27, both of which are driven in a direction opposite that of the bale chamber direction by conventional drive means appropriately coupled to gear box 40. In FIG. 1, floor roll 26 receives bale material at its forward surface, moving the bale material upward and rearward, clockwise as shown in FIG. 1. Bale material leaves the floor roll 26 and enters the bale chamber which rotates moving the bale material from a lower position, rearward and upward in a circular motion, counterclockwise as shown in FIG. 1. These rolls 26, 27 may be provided with ribs 41, 42 to enhance their ability to convey crops in the chamber as a bale is being formed. Other forms of aggressive surface structure may be used to accommodate various types of crops and conditions.

The twine dispensing assembly 12 and the twine cutting assembly 13 may be connected to the baler 10 proximate the inlet opening to the bale forming chamber. For example, as shown in the exemplary embodiments, the twine dispensing assembly 12 may be bolted to a front cross tube 49 (see e.g., FIG. 4) and a twine cutting assembly 13 may be bolted to the left side wall 17a of the baler 10.

Figure 2:
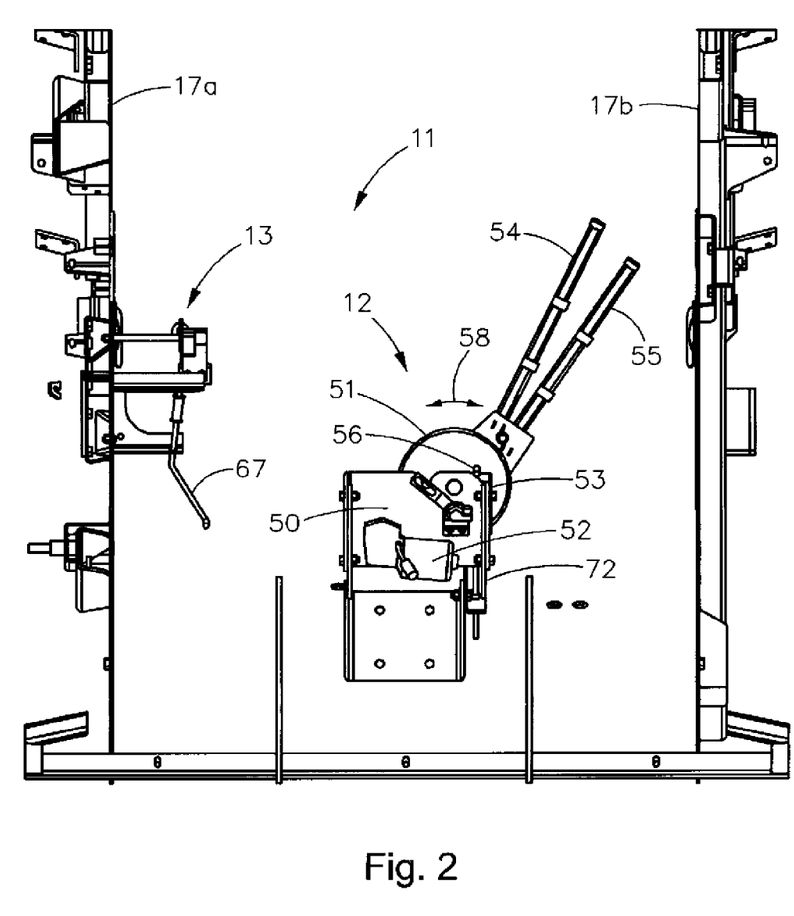
FIG. 2 is a bottom view of an exemplary twine wrapping system having an end wrap adjustment showing the twine arms of the twine dispensing assembly in the extended or right hand position.
Figure 3:
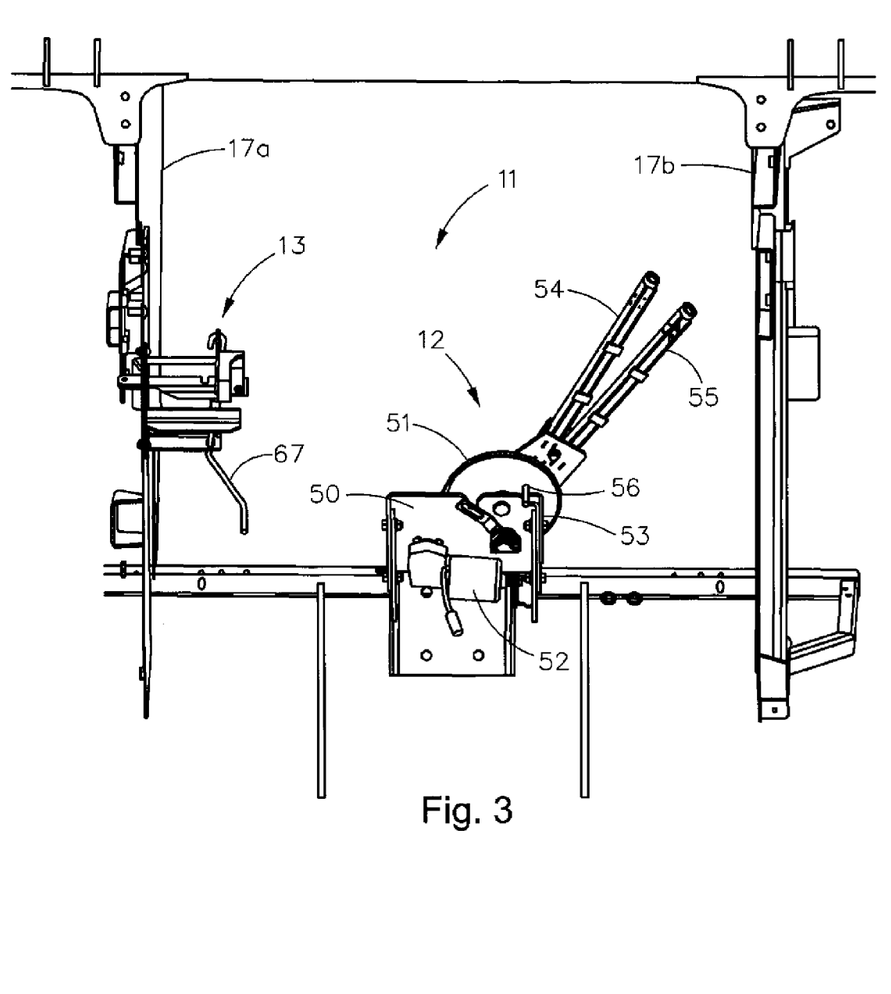
FIG. 3 is a bottom/rear view of the exemplary twine wrapping system having an end wrap adjustment of FIG. 2.

FIGS. 2 and 3 show an exemplary embodiment of the bale twine wrapping system 11 comprising a twine dispensing assembly 12 and a twine cutting assembly 13 (also referred to herein as twine knife assembly). FIG. 2 is a bottom view and FIG. 3 is a bottom rear view looking toward the front of the baler 10. FIG. 3 is rotated a bit from the view of FIG. 2 to better show the stop pin 56 and its position against the stop plate 53.

As shown, the twine dispensing assembly 12 includes a twine arm pivot support 50, a twine arm drive 51, a twine arm drive motor 52, a stop plate 53, a leading twine arm 54, a trailing twine arm 55, and a stop pin 56. The twine dispensing assembly 12 rotates the twine arms 54, 55 across the opening of the bale chamber. In the illustrated embodiment, the twine dispensing assembly 12 rotates the twine arms 54, 55 counterclockwise (arrow 58) from an extended position proximate the right side wall 17b (referred to herein as the right hand side or extended position) to a home position proximate the left side wall 17a (referred to herein as the left hand side or home position). This movement of the twine arms 54, 55 allows twine to be dispensed in to the bale chamber and laterally across the bale during bale wrapping.

As shown, the twine knife assembly 13 comprises a knife 60, a knife support assembly 61, a knife pivot bar 62, a twine guiding surface 63, a striker plate 64, an adjustment comb 65 have a plurality of slots 66, and a linkage 67. As shown, the knife 60 is connected (e.g., bolted) to the knife weld assembly 61, which allows the knife 60 to pivot up and down on knife pivot bar 62 to engage striker plate 64 and cut twine traveling over striker plate 64. The knife 60 is activated by the twine arms 54, 55 engaging a distal end 68 of linkage 67.

Embodiments of the present invention allow for end wrap adjustment of the right hand side or extended position without contacting or pulling of the twine after the twine leaves the twine arms. The right hand side end wrap adjustment may be accomplished by controlling the travel of the twine arms 54, 55, and hence the lateral position (e.g., distance from the baler right side wall) of the twine with respect to the right side wall 17b. In the exemplary embodiment, this is accomplished by providing a physical stop to adjustably control the movement of the twine dispensing assembly 12, which dictates where the twine arms are positioned for the right hand side end wrap position. For example, by adjusting the position of the stop plate 53 an operator can control the point in the rotation of the twine arm drive 51 at which stop pin 56 contacts stop plate 53. This adjustment allows for the controlled positioning of the twine on the side or end of the bale.

As shown in the figures (see e.g., FIGS. 2-6), the right hand side end wrap position adjustment may comprises overlapping plates. As shown, an inside or inner plate 70 may be fixed and an outside or outer plate 71 may be movable (in this embodiment, movable plate 71 corresponds to stop plate 53). In the illustrated embodiment, a first fastener 74 may secure the inner plate 70 to the baler frame 72 and a second fastener 75 may secure the inner plate 70 and the outer plate 71 to the baler frame 72. An elongate slot 76 may be formed in the outer plate to allow sliding movement of outer plate 71 with respect to inner plate 70 (see FIG. 6). This sliding movement allows stop plate 53 (outer plate 71) to move fore and aft with respect to the baler and can be used to control the movement of the twine dispensing assembly 12 and hence adjust the right hand side end wrap position. The figures show the plates 70, 71, 72 connected using bolts. Other fastening means are also contemplated. For example, wing-nut type fasteners may be used in order to avoid the need of tools to adjust the position of stop plate 53 (outer plate 71).

Adjusting the stop plate 53 to be engage earlier in the rotation of the twine arm drive 51 travel (e.g., moving the stop plate 53 in an aft direction) will result in the twine being positioned laterally further from the right side wall 17b. Alternatively, adjusting the stop plate 53 to be engage later in the rotation of the twine arm drive 51 travel (e.g., moving the stop plate 53 in an forward direction—arrow 46 of FIG. 1) will result in the twine being positioned laterally closer to the right side wall 17b.

In another embodiment, the twine position in the extended position may be controlled electronically by sensing the position of the twine arms and stopping the twine arm drive motor 52, which is driving twine arm drive 51, when the desired position of the twine arms has been reached. Sensing could be done, for example, with a potentiometer, proximity switch or other position sensing device.

Figure 4:
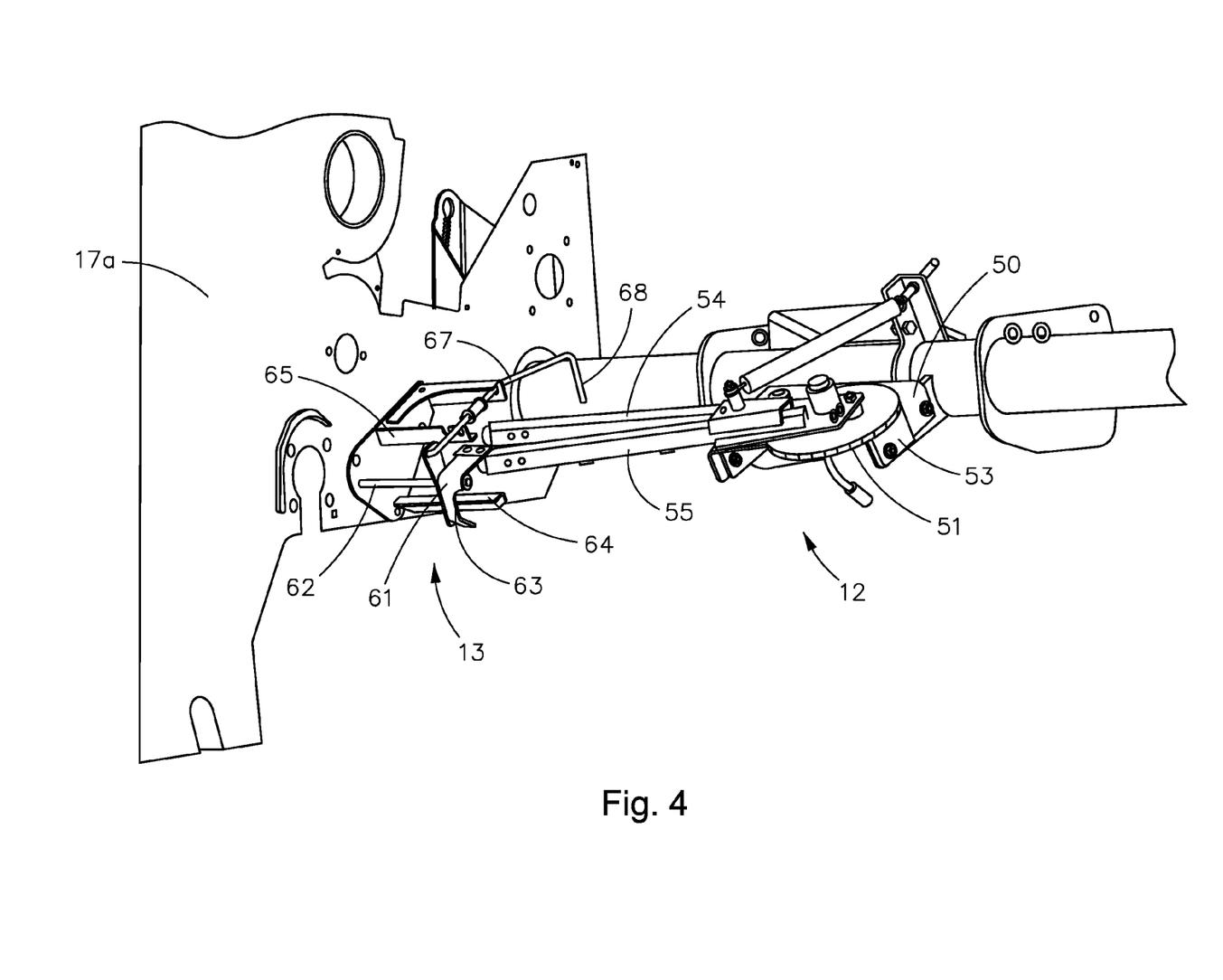
FIG. 4 is a forward prospective view of the exemplary twine wrapping system having an end wrap adjustment showing the twine arms in the pre-cut position.

FIG. 4 show the twine wrapping system 11 in the pre-cut position. This forward view shows the twine dispensing assembly 12 having the twine arms 54, 55 rotated over toward the left side wall 17a and about to engage linkage 67 of the twine cutting assembly 13. The knife 60 and knife support assembly 61 are in the open position. In the illustrated embodiment, the twine cutting assembly 13 is used to control the left hand side end wrap position of the twine.

As shown in FIG. 4, knife support assembly 61 and twine guiding surface 63 control the lateral distance of the twine from the left side sheet 17a as the twine wrapping system 11 enters the home position. In the pre-cut position, the twine is still being dispensed and is going on to the bale. The twine (not shown) would be flowing from the twine arms, over top of the striker plate 64, underneath knife 60, against the end position surface of the twine guiding surface 63, and into the bale chamber.

Figure 5:
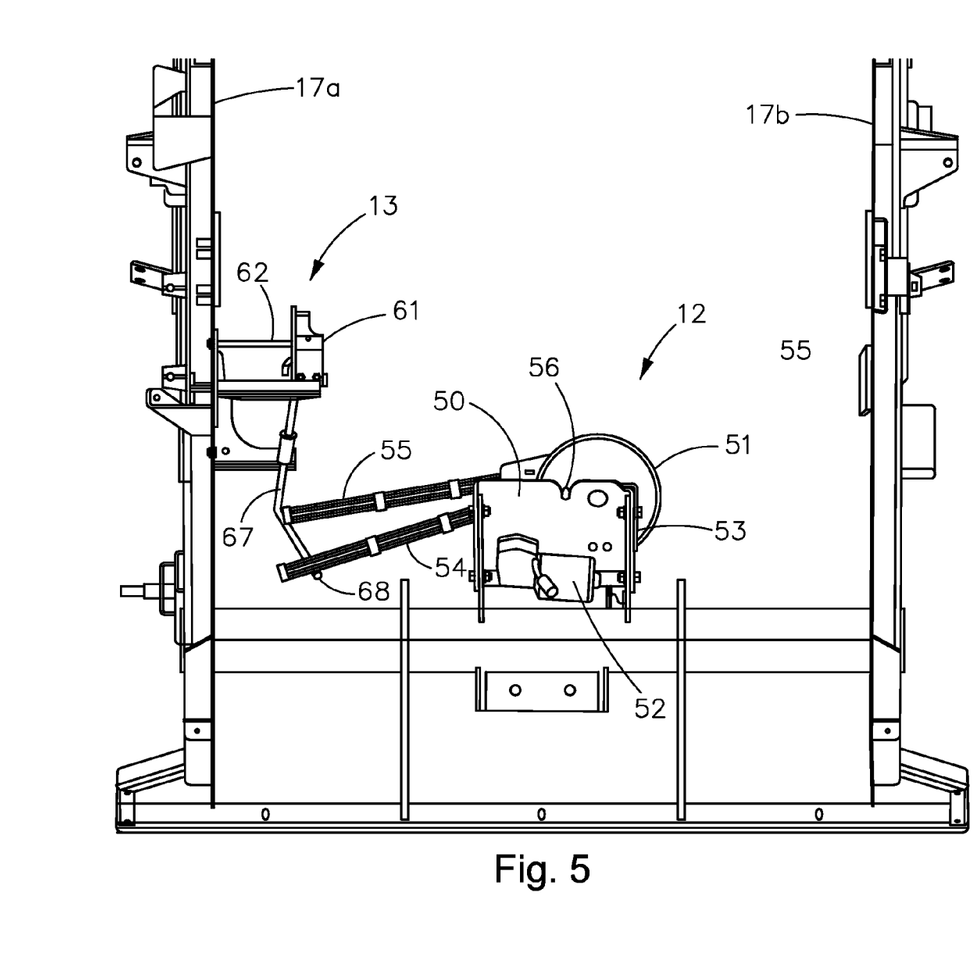
FIG. 5 is a bottom view of the exemplary twine wrapping system having an end wrap adjustment showing the twine arms in the home or left hand position.
Figure 6:
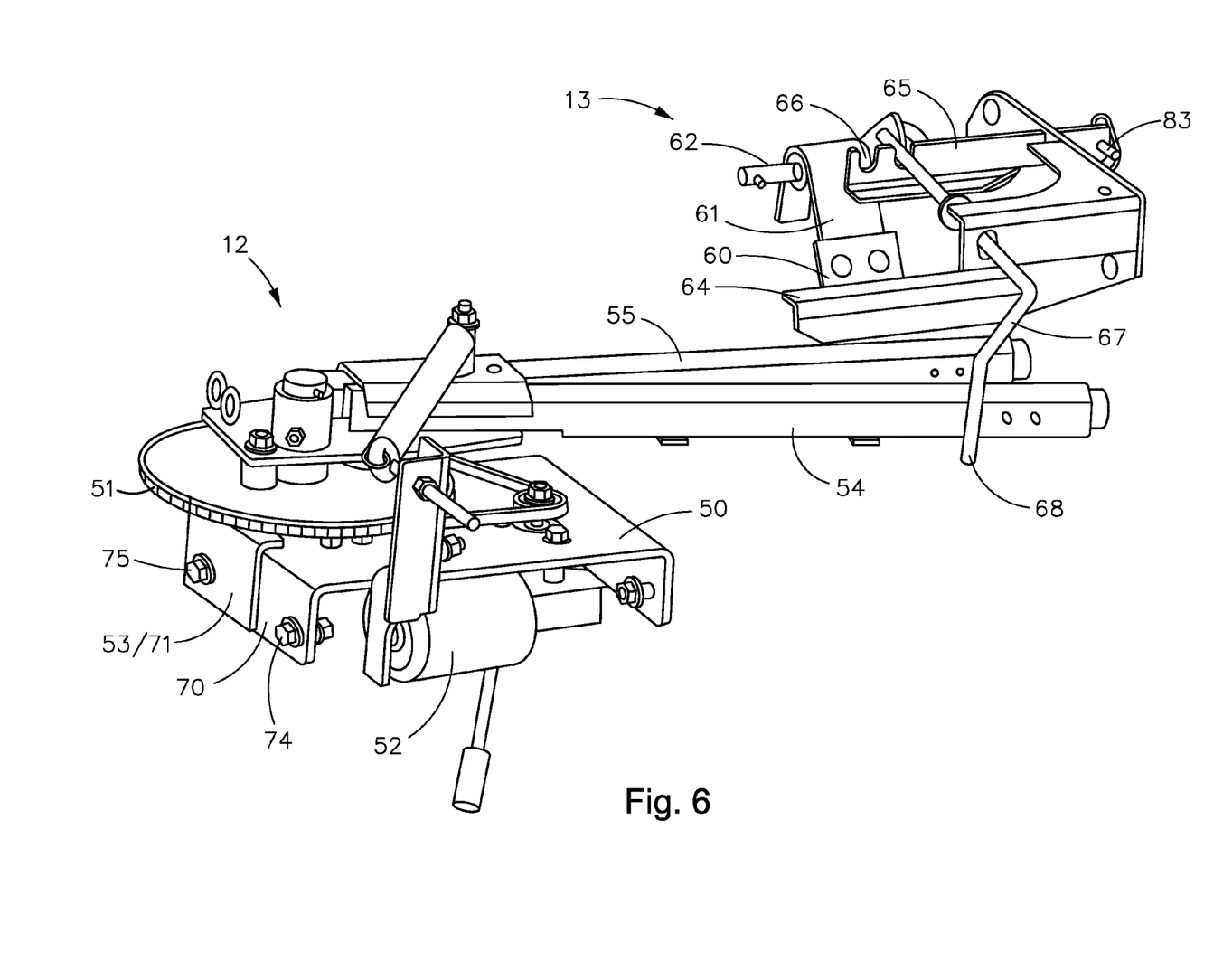
FIG. 6 is a detail view of the exemplary twine wrapping system having an end wrap adjustment of FIG. 5.

FIGS. 5 and 6 show the twine wrapping system 11 in the home position. FIG. 5 is a bottom view showing the twine arms 54, 55 engaging linkage 67. FIG. 6 is a rear view showing activation of the twine knife assembly 13 and the knife 60 rotated into the cut position. In the home position, the twine arms 54, 55 have moved to the far left position, have engaged linkage 67, and have activated the twine cutting assembly 13. As the twine arms 54, 55 act on distal end 68 of linkage 67, the linkage 67 moves and this motion causes rotation of knife support assembly 61. This rotation of the knife support assembly 61 about the knife pivot bar 62 causing knife 60 to engage striker plate 64 and the twine is cut.

Figure 7:
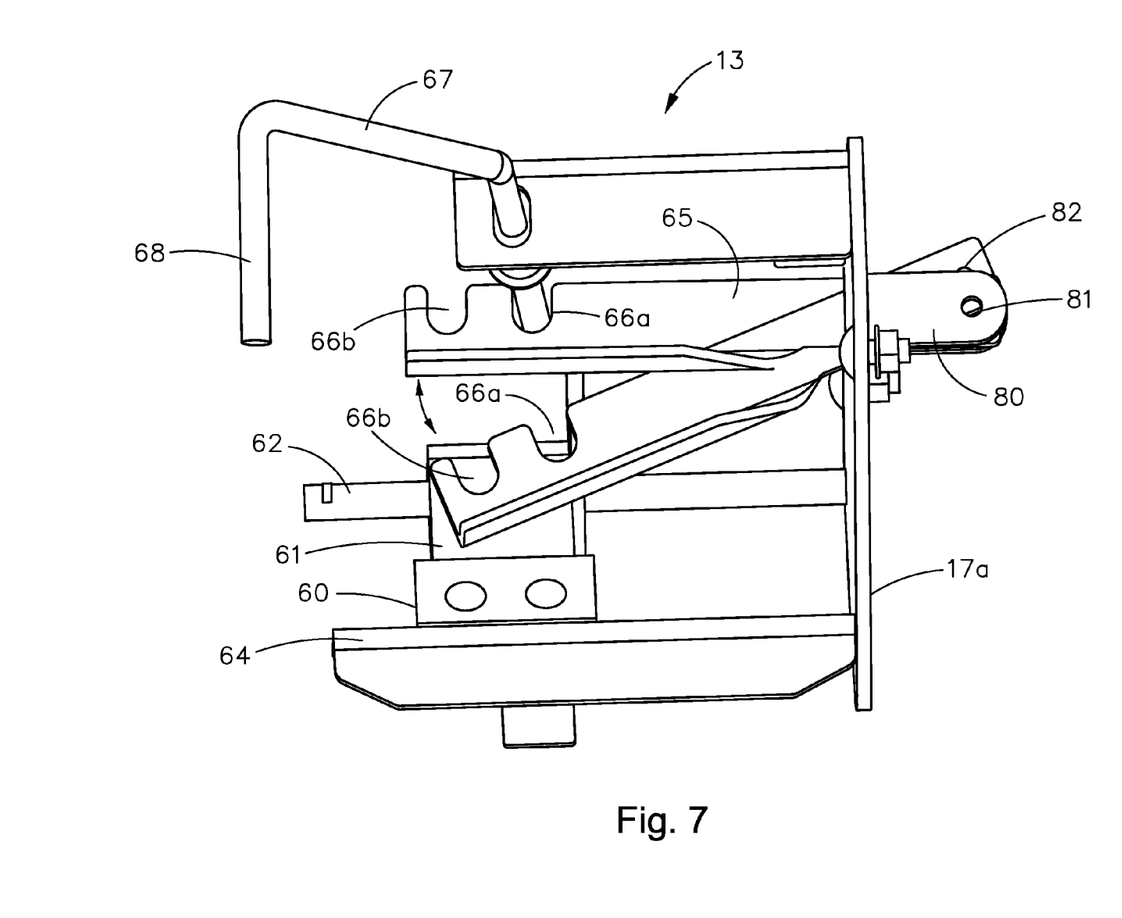
FIG. 7 is front detail view of an exemplary twine cutting assembly of the twine wrapping system having an end wrap adjustment.
Figure 8:
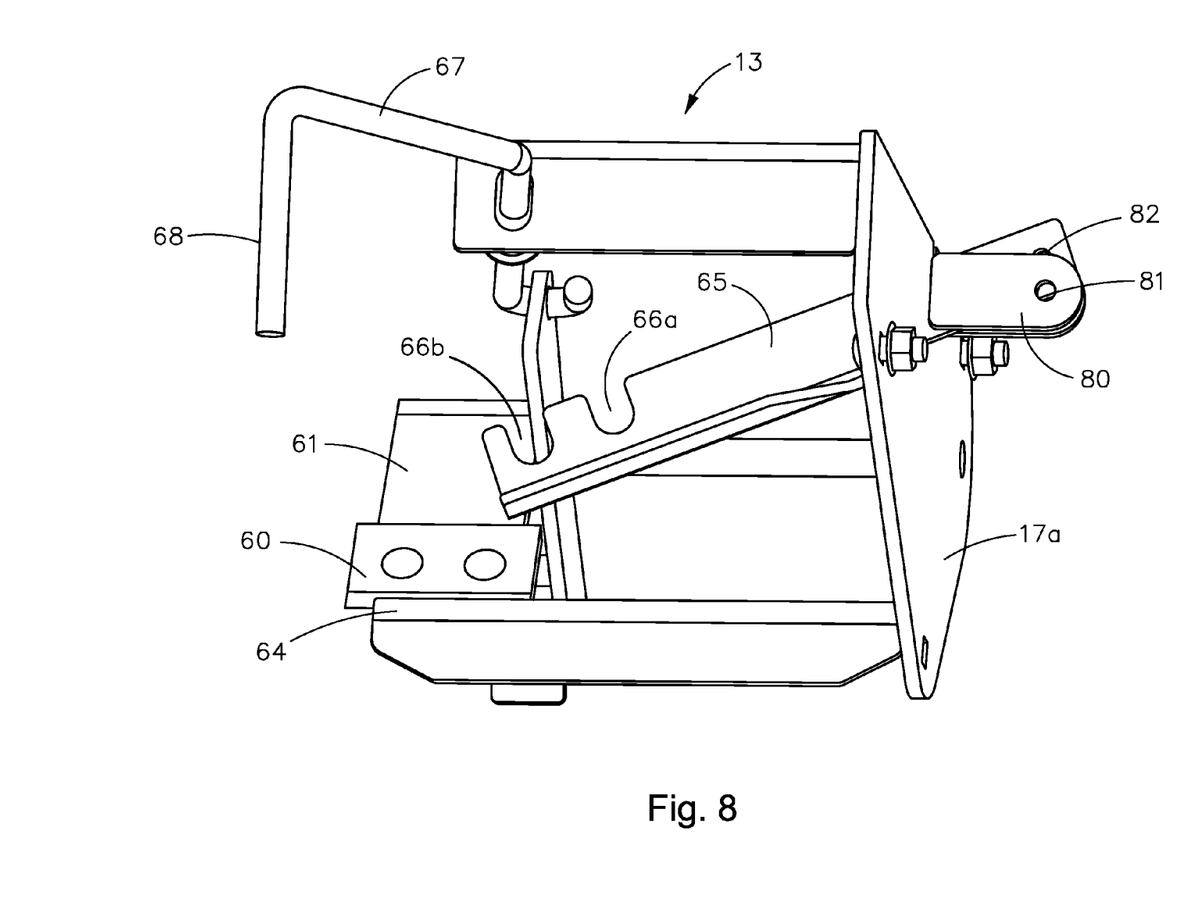
FIG. 8 shows another front detail view of an exemplary knife assembly of the twine wrapping system having an end wrap adjustment.

FIGS. 7 and 8 show details of the knife cutting assembly 13 and the left hand side or home position end wrap adjustment. FIG. 7 is a view looking forward showing the knife supporting assembly 61 in a first position. FIG. 8 is a forward looking view showing the knife supporting assembly 61 in a second position. As shown, the adjustment of the left hand side end wrap position may be accomplished using an adjustable comb structure 65 having a plurality of slots 66 that allows for controlled lateral positioning of the knife 60, knife support assembly 61, and twine guiding surface 63.

As shown in FIGS. 7 and 8, the comb 65 includes two slots 66a and 66b, although any number of slots may be provided in alternate embodiments. As shown in FIG. 7, the comb 65 may rotate downward to allow for movement of linkage 67 and corresponding movement of the knife 60, knife support assembly 61, and twine guiding surface 63.

As shown, comb bracket 80 having hole 81 may extend from the side wall 17a. A corresponding hole 82 may be provided in a securing portion of comb 65 opposite the slots 66. A pin 83 may be used to secure comb 65 to comb bracket 80. Preferably, pin 83 is self-locking, such as a clip pin or cotter pin type design. Pin 83 may be removed to allow rotation of comb 65 and adjustment of the right hand end wrap position by changing the slot position of linkage 67.

FIG. 7 shows the linkage 67 in slot 66a and FIG. 8 shows the linkage 67 in slot 66b. Slot 66a is located closer to the side wall 17a and therefore allows the twine to be positioned closer to the side or end of the bale in the left hand side end wrap position. As shown in FIG. 7, the knife 60, knife support assembly 61, and twine guiding surface 63 have moved laterally on knife pivot bar 62 to a position closer to side wall 17a. Slot 66b is located further from the side wall and therefore allows the twine to be positioned further from the side or end of the bale in the left hand side end wrap position. As shown in FIG. 8, the knife 60, knife support assembly 61, and twine guiding surface 63 have moved laterally on knife pivot bar 62 to a position further from side wall 17a.

As shown, the left hand side or home position end wrap adjustment allows an operator to adjust the twine position on the bale side or end by moving knife support assembly 61 in and out (e.g., laterally side to side) on the knife pivot bar 62 using the comb member 65 having a plurality of slots 66. The end wrap adjustment helps position the knife support assembly 61, and hence the twine guiding surface 63, in the correct position for the desired end wrap position. The position of the linkage 67 in the comb slots 66 dictates where the twine knife support assembly 61 actually resides. In this manner, the twine knife assembly 13 allows for end wrap adjustment to control where the twine is positioned on the bale.

During operation of some embodiments, the twine tubes would position the twine farther out towards the left side sheet 17a than what the twine knife assembly 13 allows. As such, the twine actually contacts the twine guiding surface 63 of the knife cutting assembly 13, and the knife cutting assembly 13 moves the twine closer to the center of the bale than the twine would otherwise be positioned. The actually distance of the twine from the side wall 17a depends on the position of linkage 67 in slots 66 of comb 65.

Embodiments of the present invention allow for quick and relatively easy adjustment of the left hand end wrap position via an adjustment feature that laterally positions the knife support assembly 61. Positioning of the knife support assembly 61 also serves to position twine guiding surface 63 for the twine. This quick and relatively easy adjustment allows the twine to be correctly fed on to the left hand side of the bale.

In operation, a bale wrapping sequence is commenced once it is determined that a bale has been formed in the bale chamber. The twine dispensing system starts, for example, in a center position and twine passes through a passageway in the twine arms. Twine is grabbed by the crop materials flowing into the bale chamber and begins to wrap the bale. The twine arm drive motor 52 causes rotation of the twine arm drive 51 and the twine arms 54, 55 move toward the right hand side or extended position proximate the right side wall 17b until the stop 53, 56 is reached. The twine dispensing system 12 puts the appropriate amount of twine on the bale and then commences movement of the twine arms 54, 55 across the surface of the bale toward the left hand side or home position proximate the left side wall 17a. Travel of the twine arms 54, 55 toward the left side wall 17a continues until the twine arms 54, 55 engage the linkage 67 of the twine cutting assembly 13 and the knife 61 strikes the striker plate 64. This limits further movement of the twine arms 54, 55.

As shown and described, the right side end wrap position may be defined by the adjustment of the right hand side end wrap adjustment, as described above with reference to FIGS. 2-3, and the left side end wrap position may be defined by the adjustment of the left hand side end wrap adjustment, as described above with reference to FIGS. 5-8.

Embodiments of the present invention allow the end wrap position to be controlled by controlling the location of the twine arms as opposed to actually having some deflector that deflects or pushes the twine inward of the side sheet. Embodiments of the present invention allow the end wrap position to be controlled by controlling the location of the knife 60, knife support assembly 61, and twine guiding surface 63 of the knife cutting assembly 13. Other embodiments include combinations of these end wrap adjustment techniques. These end wrap adjustments are preferably made without the use of tools.

Although the invention has been described with reference to exemplary embodiments, it is not limited thereto. For example, it is foreseeable that the up-cut net knife could be used in cutting twine on round and square balers. Those skilled in the art will appreciate that numerous changes and modifications may be made to the preferred embodiments of the invention and that such changes and modifications may be made without departing from the true spirit of the invention. It is therefore intended that the appended claims cover be construed to all such equivalent variations as fall within the true spirit and scope of the invention.

What is claimed is:

1. A bale wrapping system having an end wrap adjustment comprising:
   a twine dispensing assembly comprising a plurality of twine arms and a first side end wrap adjustment for adjustably controlling a position of the twine arms of the twine dispensing assembly with respect to a first side wall of a baler when the bale wrapping system is in an extended position; and
   a twine cutting assembly comprising a second side end wrap adjustment for adjustably controlling the position of a knife support assembly and a twine guide surface of the twine cutting assembly with respect to a second side wall when the bale wrapping system is in a home position; and
   wherein the first side end wrap adjustment includes an adjustable stop plate and a stopping member extending from a powered driving element of the twine arms, the stopping element configured to engage the adjustable stop plate to limit the movement of the twine arms in the extended position.

2. The bale wrapping system of claim 1, the twine dispensing assembly wherein:
   the driving element comprises:
      a twine arm drive;
      a twine arm drive motor for rotating the twine arm drive about a twine arm pivot;
      the twine arms are connected to the twine arm drive and extending radially relative to the twine arm pivot; and
      the stopping element is a stop pin extending from the twine arm drive.

3. The bale wrapping system of claim 2, the first side end wrap adjustment further comprising overlapping plates, the overlapping plates comprising:
   a fixed plate, the fixed plate having a hole;
   the stop plate overlapping the fixed plate and having an elongate slot;
   a fastener passing through the elongate slot of the stop plate and the hole of the fixed plate, the fastener securing the stop plate to the fixed plate,
   wherein the elongate slot of the stop plate allowing sliding movement of stop plate with respect to fixed plate, the sliding movement of the stop plate allowing repositioning of the stop plate to control movement of the twine arms and hence adjustment of the first side end wrap position.

4. The bale wrapping system of claim 3, wherein the fastener comprises a wing-nut type fastener to avoid the need of tools to adjust the position of stop plate.

5. The bale wrapping system of claim 3, wherein adjusting the stop plate to be engage earlier in the rotation of the twine arm drive travel results in the twine arms being positioned laterally further from the first side wall, and adjusting the stop plate to be engage later in the rotation of the twine arm drive travel results in the twine arms being positioned laterally closer to the first side wall.

6. The bale wrapping system of claim 1, wherein end wrap adjustment on the first side when the bale wrapping system is in the extended position is accomplished without contacting the twine after the twine has exited the twine arm.

7. The bale wrapping system of claim 1, wherein the twine arm position in the extended position is controlled electronically by sensing the position of the twine arms and stopping the twine arms when the desired position of the twine arms has been reached.

8. The bale wrapping system of claim 1, wherein the bale wrapping system is used on an agricultural baler, wherein adjustment of the first side end wrap adjustment on the twine dispensing assembly allows for the controlled positioning of twine on the side or end of a bale of crop material formed in the baler.

9. The bale wrapping system of claim 1, the second side end wrap adjustment of the twine cutting assembly further comprising:
the knife support assembly rotatably and slidably mounted on a knife pivot bar oriented orthogonal to the second side wall;
a knife connected to the knife support;
the twine guide surface adapted for contacting twine when the bale wrapping system is in a pre-cut position;
a linkage connected to the knife support assembly, the linkage having a distal end for engaging the twine arms of the twine dispensing assembly in the home position; and
a comb extending laterally from the second side wall, the comb having a plurality of slots;
the linkage being movably and selectively inserted into one of the slots on the comb, wherein movement of the linkage causes corresponding lateral movement of the knife assembly, knife, and twine guide surface.

10. The bale wrapping system of claim 9, further comprising:
an opening in the second side wall;
a securing portion of the comb, the securing portion extending through the opening in the second side wall;
a hole in the securing portion of the comb;
a comb bracket extending from the second side wall in an opposite direction as the comb;
a hole in the comb bracket; and
a pin adapted to pass through the hole in the comb bracket and the hole in the securing portion of the comb to secure and hold the comb in position.

11. The bale wrapping system of claim 10, wherein:
the pin is removable;
with the pin removed, the comb being rotatable to allow for lateral movement of linkage and corresponding lateral movement of the knife support assembly, knife, and twine guide surface.

12. The bale wrapping system of claim 10, wherein the pin is a clip pin, wherein removal of the pin and adjustment of the second side end wrap adjustment without the use of tools.

13. The bale wrapping system of claim 9, wherein the comb further comprises:
a first slot located closer to the second side wall; and
a second slot located further from the second side wall than the first slot;
wherein when the linkage is adjusted to reside in the first slot the twine arms are allowed to travel to a position closer to the second side wall as compared to when the linkage is positioned in the second slot;
wherein when the linkage is adjusted to reside in the second slot the twine arms are limited to travel to a position further from the second side wall as compared to when the linkage is positioned in the first slot.

14. An agricultural baler twine wrapping system comprising:
a twine dispensing assembly having a plurality of twine arms and a first side end wrap adjustment for adjustably controlling a position of the twine arms with respect to a first side wall when the twine arms are in an extended position;
the twine dispensing assembly further comprising:
a twine arm drive;
a twine arm drive motor for rotating the twine arm drive about a twine arm pivot;
the twine arms connected to the twine arm drive and extending radially relative to the twine arm pivot;
the first side end wrap adjustment further comprising:
an adjustable stop plate;
a stop pin extending from the twine arm drive, the stop pin engaging the adjustable stop plate to limit the movement of the twine arms in the extended position;
a twine cutting assembly having a second side end wrap adjustment for adjustably controlling the position of twine with respect to a second side wall when the bale wrapping system is in a home position;
the twine cutting assembly further comprising:
a knife support assembly rotatably and slidably mounted on a knife pivot bar oriented orthogonal to the second side wall;
a knife connected to the knife support;
a twine guide surface on the knife support assembly, the twine guide surface adapted for contacting twine when the bale wrapping system is in a pre-cut position and moving toward the home position;
the second side end wrap adjustment further comprising:
linkage connected to the knife support assembly, the linkage having a distal end for engaging twine arms of the twine dispensing assembly in the home position; and
a comb extending laterally from the second side wall, the comb having a plurality of slots;
the linkage being movably and selectively inserted into one of the slots on the comb, wherein movement of the linkage from one slot to another causes corresponding lateral movement of the knife assembly, knife, and twine guide surface.

15. A twine dispensing assembly having an end wrap adjustment for adjustably controlling a position of twine arms with respect to a side wall of a baler when the twine dispensing assembly is in an extended position, the twine dispensing assembly comprising:
a twine arm pivot support;
a twine arm drive rotatably mounted to the twine arm pivot support;
a twine arm drive motor for rotating the twine arm drive about a twine arm pivot;
twine arms connected to the twine arm drive and extending radially relative to the twine arm pivot;
an end wrap adjustment comprising:
a stop plate adjustable connected to the twine arm pivot support;
a stop pin extending from the twine arm drive, the stop pin engaging the adjustable stop plate to limit the movement of the twine arms in the extended position.

16. A twine cutting assembly of a bale wrapping system having an end wrap adjustment for adjustably controlling a position of twine arms with respect to a side wall of a baler-when the bale wrapping system is in a home position, the twine cutting assembly comprising:
    a knife support assembly rotatably and slidably mounted on a knife pivot bar oriented orthogonal to the side wall;
    a knife connected to the knife support;
    a twine guide surface on the knife support assembly, the twine guide surface adapted for contacting twine when the bale wrapping system is in the home position;
    an end wrap adjustment comprising:
        linkage connected to the knife support assembly; and
        a comb extending laterally from the side wall, the comb having a plurality of slots spaced apart laterally on the comb;
    the linkage being movably and selectively inserted into one of the slots on the comb, wherein movement of the linkage from one slot to another causes corresponding lateral movement of the knife assembly, knife, and twine guide surface relative to the side wall.

* * * * *